(12) United States Patent
Buhri et al.

(10) Patent No.: US 8,517,654 B2
(45) Date of Patent: Aug. 27, 2013

(54) THREADED BOLT

(75) Inventors: Reinhard Buhri, Frastanz (AT); Stefan Boenig, Acherg-Esseratsweiler (DE)

(73) Assignee: Hilti Aktiengesellschaft, Schaan (LI)

( * ) Notice: Subject to any disclaimer, the term of this patent is extended or adjusted under 35 U.S.C. 154(b) by 386 days.

(21) Appl. No.: 12/590,134

(22) Filed: Nov. 2, 2009

(65) Prior Publication Data

US 2010/0111640 A1 May 6, 2010

(30) Foreign Application Priority Data

Nov. 4, 2008 (DE) .................. 10 2008 043 435

(51) Int. Cl.
*F16B 35/04* (2006.01)

(52) U.S. Cl.
USPC .......... 411/424; 411/411; 411/369; 411/901; 411/902; 411/903; 411/908

(58) Field of Classification Search
USPC ............... 411/65, 71, 80.6, 82.3, 383, 411, 411/424, 432, 901, 902, 903, 908
See application file for complete search history.

(56) References Cited

U.S. PATENT DOCUMENTS

| | | | |
|---|---|---|---|
| 1,265,246 A * | 5/1918 | Pleister ........................ 411/63 |
| 2,314,897 A * | 3/1943 | Purinton .................... 24/101 R |
| 2,432,986 A | 12/1947 | Forman |
| 2,549,993 A * | 4/1951 | Temple ......................... 227/11 |
| 2,637,241 A * | 5/1953 | Erickson et al. ............. 411/440 |
| 2,724,116 A * | 11/1955 | Termet ........................... 227/10 |
| 2,855,817 A * | 10/1958 | Kope ............................ 411/441 |
| 2,935,552 A | 5/1960 | Forman |
| 3,078,334 A | 2/1963 | Forman |
| 3,618,445 A * | 11/1971 | Hartmann et al. ............ 411/441 |
| 3,978,759 A * | 9/1976 | Bakoledis .................... 411/441 |
| 4,003,175 A * | 1/1977 | Patry ......................... 52/506.05 |
| 4,043,239 A * | 8/1977 | DeFusco ...................... 411/337 |
| 4,354,725 A * | 10/1982 | Herbaugh et al. ........... 439/736 |
| 4,621,963 A * | 11/1986 | Reinwall ...................... 411/369 |
| 4,975,014 A * | 12/1990 | Rufin et al. .................. 411/385 |
| 5,090,857 A * | 2/1992 | Dunn ........................... 411/385 |
| 5,549,432 A * | 8/1996 | Reneau ......................... 411/432 |
| 5,569,008 A * | 10/1996 | Chapkovich ................. 411/383 |
| 5,622,464 A * | 4/1997 | Dill et al. ..................... 411/399 |
| 5,641,256 A * | 6/1997 | Gundy ........................... 411/55 |
| 5,649,798 A * | 7/1997 | Ito ................................ 411/369 |
| 6,712,573 B1 * | 3/2004 | Huber ............................ 411/71 |
| 6,824,342 B2 * | 11/2004 | Gassmann et al. ........... 411/441 |
| 6,981,723 B2 | 1/2006 | Lansvik |
| 7,014,409 B2 * | 3/2006 | Allaart et al. ................ 411/487 |
| 7,207,761 B2 * | 4/2007 | Dill et al. ..................... 411/450 |
| 7,284,940 B2 * | 10/2007 | Lee ............................... 411/447 |
| 2002/0114681 A1 * | 8/2002 | Tseng ........................... 411/383 |

FOREIGN PATENT DOCUMENTS

| | | |
|---|---|---|
| DE | 199 12 668 | 9/2000 |
| DE | 202 09 675 | 10/2002 |
| GB | 1 354 351 | 5/1974 |

\* cited by examiner

*Primary Examiner* — Roberta Delisle
(74) *Attorney, Agent, or Firm* — Abelman, Frayne & Schwab

(57) ABSTRACT

A threaded bolt includes a head (11), a load cation section (12) having a bar-shaped core region (17), an attachment section (13), with the head (11), the core region (17), and the attachment section (13) being formed as a one-piece part formed of metal, and a thread (15)-carrying threaded sleeve (16) formed of a plastic material and secured radially outwardly on the core region (17), with the thread (15) of the threaded sleeve (16) forming the outer thread of the load-application section (12).

19 Claims, 1 Drawing Sheet

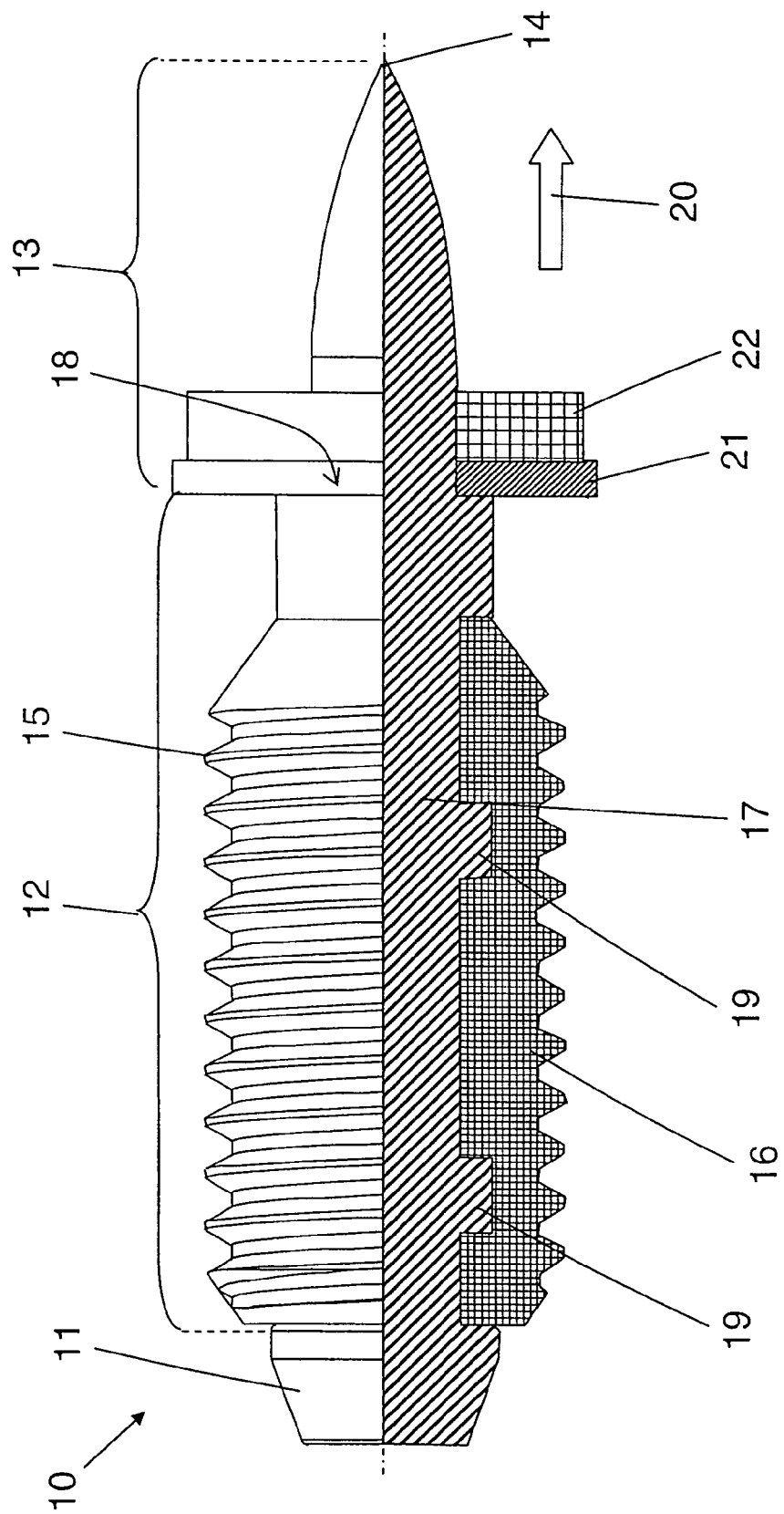

ately, the sleeve, reducing overall manufacturing costs.

THREADED BOLT

BACKGROUND OF THE INVENTION

1. Field of the Invention

The present invention relates to a threaded bolt having a head, a load-application section provided with an outer thread, and an attachment section.

2. Description of the Prior Art

German Utility Model DE 202 09 675 U discloses a threaded bolt having a head, a load application section provided with an outer thread, and an attachment section. The threaded bolt is formed of a stainless high-quality steel which makes its manufacturing complicated and cost-intensive.

The object of the invention is to provide a threaded bolt that can be produced more cost-effectively than the known threaded bolt, without difficulty and that can be driven in a workpiece with a hand-held setting tool.

SUMMARY OF THE INVENTION

This and other objects of the present invention, which will become apparent hereinafter, are achieved by providing a threaded bolt the load application section of which has a bar-shaped core region, and the head, the core region, and the attachment section are formed as a one-piece part formed of metal, and there is provided a thread-carrying threaded sleeve formed of a plastic material and secured radially outwardly on the core region, with the thread of the threaded sleeve forming the outer thread of the load application section.

With the inventive threaded bolt, the manufacturing costs are noticeably reduced, while the robustness of the threaded bolt is retained. When the threaded bolt is driven by a hand-held setting tool, e.g., combustion energy-driven setting tool with a high setting energy of more than 80 Joule, the setting energy is applied to the head of the threaded bolt and therefrom directed to the attachment section through the core region of the load application section, without directing any setting energy to the threaded sleeve.

Advantageously, the threaded sleeve is injection-molded on the core region. This reduces costs of mounting of a threaded sleeve in comparison with pinning of the threaded sleeve, reducing overall manufacturing costs.

Advantageously, the core region has means for fixedly securing the threaded sleeve on the core region. Thereby, a nut can be screwed on the thread without a danger of rotation of the threaded sleeve about the core region. The means can be formed, e.g., as projections, knobs, indentations and the like.

According to a particular advantageous embodiment of the invention, the threaded sleeve is formed of a glass fiber-reinforced plastic material. Due to a high strength of the glass fiber-reinforced material, high retaining values can be achieved with the inventive threaded bolt.

It is advantageous, when the head, the core region, and the attachment section are formed of a stainless high-quality steel, which insures good corrosion-resistance.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

In the drawings:
The single FIGURE shows a cross-sectional view of a threaded bolt according to the present invention.

DETAILED DESCRIPTION OF THE PREFERRED EMBODIMENT

A threaded bolt 10 according to the present invention has a load application section 12 carrying a thread 15 provided on a threaded sleeve 16 formed of a plastic material. The threaded sleeve 16 is fixedly secured on a bar-shaped core region 17 of the load application section 12. The threaded sleeve 16 is formed, e.g., from a glass fiber-reinforced plastic material and is formed about the core region 17 by a plastic injection-molding process. In order to ensure a fixed mounting of the threaded sleeve 16 on the core region 17, projection-forming elements 19 project from the core region 17 in a radial direction. The projection-forming elements 19 prevent loosening of the material-locking connection between the threaded sleeve 16 and the core region 17 by providing a form-locking connection with the material of the threaded sleeve 16.

In a setting direction 20 of the threaded bolt 10, an attachment section 13 adjoins the load application section 12. On the free end of the attachment section 13, there is provided a tip 14. Instead of the tip 14, a flat, flattened or round end can be provided at the end of the bolt 10. Remote from the tip 14 and adjacent to the load application section 12, there is formed a head 11. The head 11 projects above the load application section 12 and, in particular, above the threaded sleeve 16 in the axial or longitudinal direction of the threaded bolt 10, so that no setting energy of a setting piston of a setting tool is applied directly to the threaded sleeve 16.

The core region 17 of the load application section 12, the attachment section 13, and the head 11 are formed of a hard corrosion-resistant material, in particular of a stainless high-quality steel.

On the attachment section 13, a stiffness disc 21 in the form of a perforated metal disc is pinned on or pressed on against a stop 18. In the setting direction 20, a circular disc-shaped sealing element 22 of a plastic material such as, e.g., a sealing disc formed of a neoprene, adjoins the stiffness disc 21. In the embodiment shown in the drawing, the stiffness disc 21 is conically curved in the setting direction 20 in order to improve a preload of the sealing element 22 after setting of the threaded bolt 10. When the threaded bolt 10 is driven in a work piece, the sealing element 22 is pressed against the workpiece by the stiffening disc 21, which is located between the load application section 12 and the attachment section 13, sealing the contact zone against penetration of any medium.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A threaded bolt, comprising a load application section (12) having a bar-shaped core region (17); an attachment section (13), the core region (17), and the attachment section (13) being formed as a one-piece part; and a helically threaded sleeve (16) supported on the core region and forming a helical thread of the load-application section (12).

2. A threaded bolt according to claim 1, wherein the threaded sleeve (16) is formed of a plastic material.

3. A threaded bolt according to claim 2, wherein threaded sleeve (16) is formed of a glass fiber-reinforced plastic material.

4. A threaded sleeve according to claim 2, wherein the threaded sleeve (16) is injection-molded on the core region (17).

5. A threaded bolt according to claim 1, wherein the core region (17) has means for form-lockingly securing the threaded sleeve thereon.

6. A threaded bolt according to claim 1, further comprising a head that has a smaller radial extent than the threaded sleeve.

7. A threaded bolt according to claim 6, wherein the head, the core region (17) and the attachment section (13) are formed as a one-piece part.

8. A threaded bolt according to claim 7, wherein the one-piece part formed by the head, the core region (17) and the attachment section (13) is formed of metal.

9. A threaded bolt according to claim 8, wherein the one-piece part formed by the head, the core region (17) and the attachment section (13) is formed of a stainless steel.

10. A threaded bolt according to claim 1, wherein the one-piece part formed by the core region (17) and the attachment section (13) is formed of metal.

11. A threaded bolt according to claim 10, wherein the one-piece part formed by the core region (17) and the attachment section (13) is formed of a stainless steel.

12. A threaded bolt according to claim 1, further comprising sealing means provided on the attachment section (13) and bearing against a stop (18) provided on the attachment section (13).

13. A threaded bolt according to claim 12, wherein the sealing means comprises a stiffness disc (21) bearing against the stop (18) and a sealing element (22) formed of a plastic material and adjoining the stiffness disc (22) in a setting direction.

14. A threaded bolt according to claim 13, wherein the sealing element is formed of neoprene.

15. A threaded bolt according to claim 1, wherein the helically threaded sleeve has an external helical thread.

16. A threaded bolt, comprising a load application section having a bar-shaped core region (17) and a helically threaded sleeve (16) supported on the bar-shaped core region (17); an attachment section (13) adjoining the load application section (12); and a sealing element (22) supported on the attachment section (13) in a spaced relationship relative to the threaded sleeve (16).

17. A threaded bolt according to claim 16, further comprising a stiffness disc (21) supported on the attachment section (13) against a stop (18), the sealing element (22) adjoining the stiffness disc (21) in a setting direction (20) of the threaded bolt.

18. A threaded bolt according to claim 16, wherein the core region (17) is formed of metal, the threaded sleeve (16) is formed of a hard plastic material, and the sealing element (22) is formed of a soft plastic material.

19. A threaded bolt according to claim 16, wherein the helically threaded sleeve has an external helical thread.

* * * * *